United States Patent [19]

Knapp

[11] Patent Number: 5,010,657
[45] Date of Patent: Apr. 30, 1991

[54] TAPE MEASURE END HOOK

[75] Inventor: Ralph E. Knapp, Barrie, Canada

[73] Assignee: Cooper Industries, Inc., Houston, Tex.

[21] Appl. No.: 374,039

[22] Filed: Jun. 29, 1989

[51] Int. Cl.⁵ .............................................. G01B 3/10
[52] U.S. Cl. ...................................... 33/770; 33/755
[58] Field of Search ................................ 33/755–771, 33/770

[56] References Cited

U.S. PATENT DOCUMENTS

| | | |
|---|---|---|
| 182,356 | 9/1876 | Chesterman . |
| 400,961 | 4/1889 | Soltmann . |
| 1,811,945 | 6/1931 | Lange . |
| 1,973,843 | 9/1934 | Buck ................................ 33/770 |
| 2,005,677 | 6/1935 | Higbee . |
| 2,076,704 | 4/1937 | Carlson . |
| 2,574,272 | 11/1951 | McCully ............................ 33/770 |
| 2,629,180 | 11/1953 | Carlson ............................ 33/770 |
| 2,663,941 | 12/1953 | Dart . |
| 2,684,534 | 7/1954 | Ljungberg . |
| 2,893,655 | 7/1959 | Carlson . |
| 3,141,628 | 7/1964 | Evans et al. ...................... 33/769 |
| 3,336,674 | 8/1967 | Higgins et al. . |
| 3,362,075 | 1/1968 | Quenot ............................. 33/770 |
| 3,418,719 | 12/1968 | Davis . |
| 3,526,964 | 11/1970 | Clark ................................. 33/27 |
| 3,611,576 | 12/1971 | Quenot ............................. 33/770 |
| 4,300,289 | 11/1981 | DeHaven . |
| 4,305,206 | 12/1981 | Roe . |

FOREIGN PATENT DOCUMENTS

| | | |
|---|---|---|
| 650324 | 10/1962 | Canada . |
| 1193853 | 7/1985 | Canada . |
| 2726247 | 11/1978 | Fed. Rep. of Germany . |
| 15416 | 6/1897 | United Kingdom . |
| 345448 | 3/1931 | United Kingdom . |

OTHER PUBLICATIONS

Stanley "Some Rules Aren't Made to be Broken" Advertisement (no date).
Stanley "The Stanley Duralock Tape Rule" Advertisement (no date).
Stanley Duralock Advertisement ©1989.
Stanley "New Duralock Tape Rule" Advertisement (no date).

Primary Examiner—Thomas B. Will
Assistant Examiner—Alvin Wirthlin
Attorney, Agent, or Firm—McDermott, Will & Emery

[57] ABSTRACT

A floating end hook for a measuring tape is disclosed which defines two openings for receipt of first and second rivets for attachment of the end hook to the measuring tape. The openings lie on an axis parallel to an inside surface of an abutting member of the end hook. The positioning of the openings allows the force produced when the end hook impacts the measuring tape housing to be approximately evenly distributed between the first and second rivets. A third opening for receipt of a third rivet may be located on the end hook a predetermined distance from the axis on which the other two openings lie. The third opening prevents the end hook from twisting and further ensures that the impacting force is evenly distributed between the first and second rivets.

6 Claims, 4 Drawing Sheets

TAPE MEASURE END HOOK

BACKGROUND OF THE INVENTION

The present invention relates to tape measures; particularly tape measure end hooks.

Coiled tape measures normally include a housing in which a coiled tape resides when not in use. Usually, the tape is extracted from the housing by hand and is retractable by hand, a spring operated device, or other similar means. Commonly, an end hook is attached to the end of the tape measure. The end hook serves several purposes. For instance, the end hook prevents the tape from being fully withdrawn into the housing so that the end of the tape becomes inaccessible to the user. In addition, the tape measure end hook provides a convenient way for the user to grab the end of the tape measure so that it may be extracted from the housing. Furthermore, the tape measure end hook may be attached to a reference point, thus eliminating the need for a user to hold the end of the tape at the reference point.

Prior art tape measure end hooks are typically sheet metal bent to form a right angle and are attached to the tape measure by one or more rivets. Usually the hook is attached to the tape in such a manner as to allow the hook to float, i.e. move a short distance along the longitudinal axis of the tape. Such an arrangement is used to allow the tape measure to be used in situations where the inside surface of the hook engages the edge of an object, as well as situations where the outside edge of the hook abuts an edge. Allowing the end hook to move along the longitudinal axis of the tape compensates for any mismeasurement that might occur due to the thickness of the end hook itself.

Several types of rivet placements are known for floating end hook tape measures. One such arrangement uses a single rivet centrally positioned along the longitudinal axis of the measuring tape. Other arrangements use two or more rivets positioned along the longitudinal axis of the measuring tape. It has been found that in single rivet designs, the rivet is subject to a large amount of stress from the edge of the end hook opening when the tape is retracted into the measuring tape housing. In designs in which two or more rivets are mounted along the longitudinal axis of the measuring tape, it has been found that due to tolerances allowed in piercing holes in tapes and end hooks, it is quite likely that one of the two or more rivets will take the full stress load of impact when the end hook hits the housing case front.

The effects of stress on a rivet accumulate over time resulting eventually in the failure of the rivet. Rivet failure in a tape measure effectively shortens the useful life of the tape measure, since the end hook will no longer be able to function properly. Therefore, there is a need to provide a tape measure end hook which will reduce the stress placed on the rivets used to attach it to a tape and thereby increase the useful life of the tape measure.

SUMMARY OF THE INVENTION

The present invention is directed to an end hook for attachment to a measuring tape. The end hook includes a tape attachment member movable along a longitudinal axis defined by the measuring tape, and an abutting member, which has an inside surface and is attached to the tape attachment member. In addition, the end hook includes means for limiting the movement of the end hook along the longitudinal axis. Two securing means positioned along an axis substantially parallel to the inside surface of the abutting member act to attach the end hook to the measuring tape.

An object of the present invention is to increase the useful life of a tape measure.

Another object of the present invention is to provide a means for distributing the stress exerted on a tape attaching means of an end hook among two or more securing means.

A further object of the present invention is to increase the life expectancy of an attaching means used to attach an end hook to a measuring tape.

An additional object of the present invention is to provide a three rivet attaching means for attaching a floating end hook to a measuring tape.

Still another object of the present invention is to provide a two rivet attaching means for attaching a floating end hook to a measuring tape.

Another object of the present invention is to limit the twisting of an end hook attached to a measuring tape.

An additional object of the present invention is to distribute the stress incurred by a floating end hook upon impact against a measuring tape housing among two or more rivets.

DETAILED DESCRIPTION OF THE PRESENTLY PREFERRED EMBODIMENTS

Figure 1:
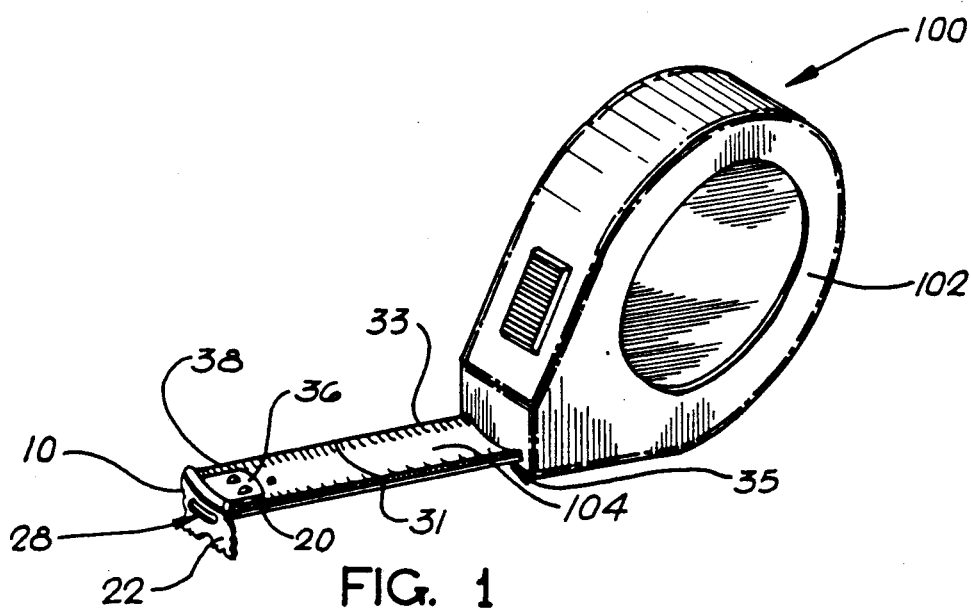
FIG. 1 is a perspective view of a tape measure including an embodiment of the tape measure end hook of the present invention.
Figure 7:
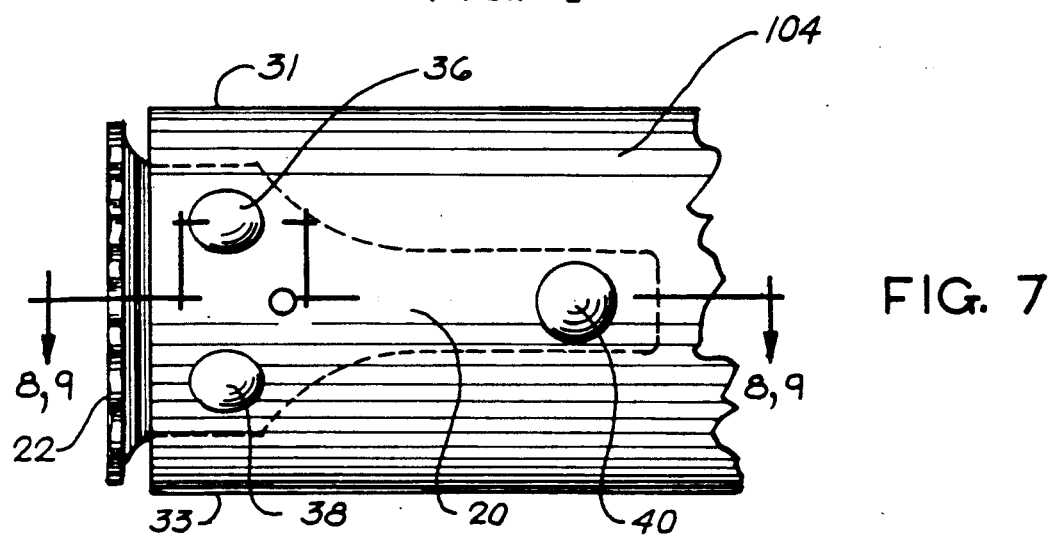
FIG. 7 is a bottom plan view of another embodiment of the tape measure end hook mounted on a tape.

The tape measure end hook 10 of the present invention is designed to be used with a retractable coiled tape measure 100 of the type shown in FIG. 1, althouqh the end hook 10 may be used with other types of tape measures. Tape measure 100 includes a housing 102. Extending from housing 102 is tape 104. In order to enable tape 104 to be drawn from housing 102 it is necessary that end hook 10 be attached to the end of tape 104.

Figure 3:
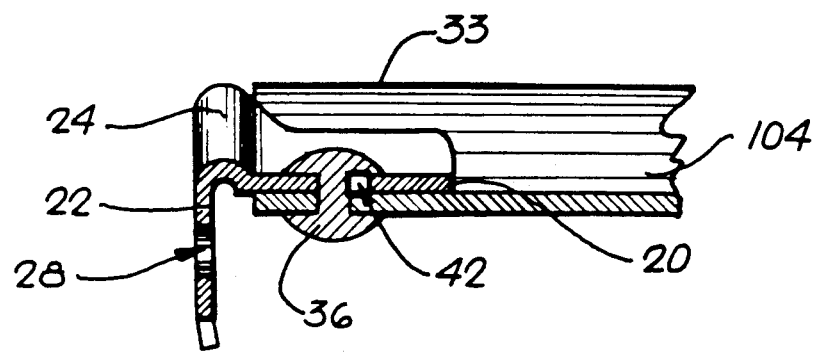
FIG. 3 is a sectional view taken along the line 3—3 of FIG. 2 in which the end hook is in a retracted position toward the tape of the tape measure.
Figure 4:
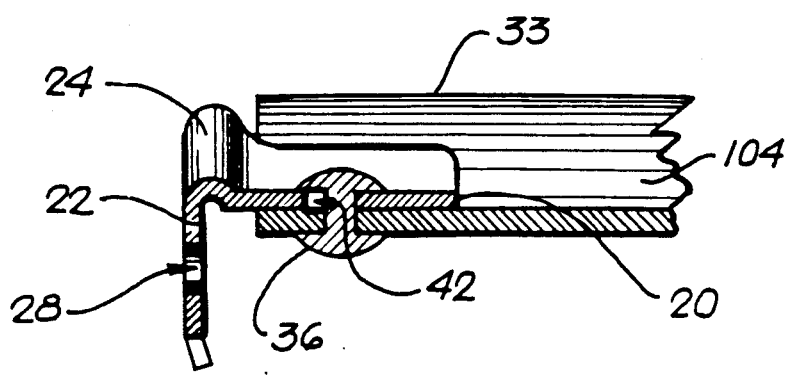
FIG. 4 is a sectional view taken along the line 4—4 of FIG. 2 in which the end hook is in an extended position away from the tape of the tape measure.
Figure 10:
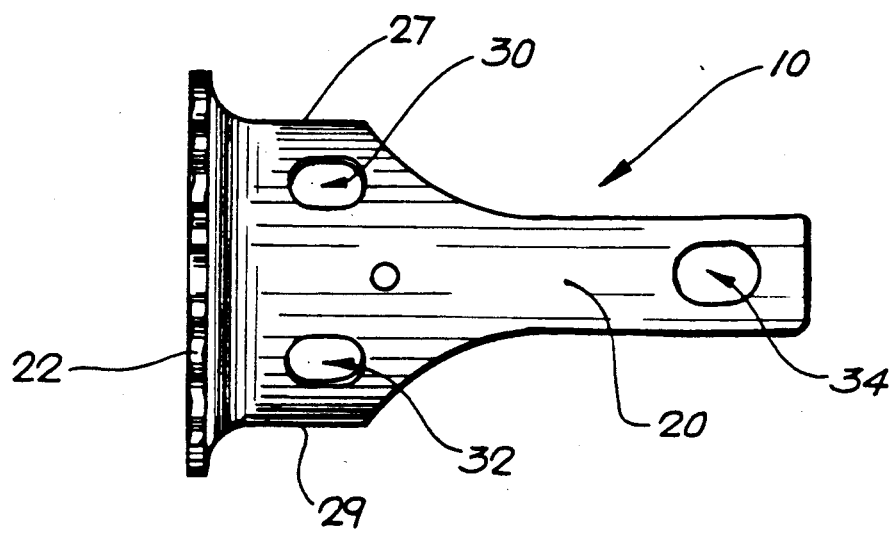
FIG. 10 is a bottom plan view of the embodiment of the tape measure end hook shown in FIG. 7.

As shown in FIGS. 3 and 4, the tape measure end hook 10 of the present invention includes a tape attachment member 20 and an abutting member 22 attached to the attachment member 20. Preferably, the tape attachment member 20 and the abutting member 22 are manufactured by bending sheet metal, preferably stainless steel, to form an approximately 90 degree bend. The end hook 10 also includes a loop 24 which strengthens the end hook 10 and allows for a substantially accurate 90 degree bend.

Figure 5:
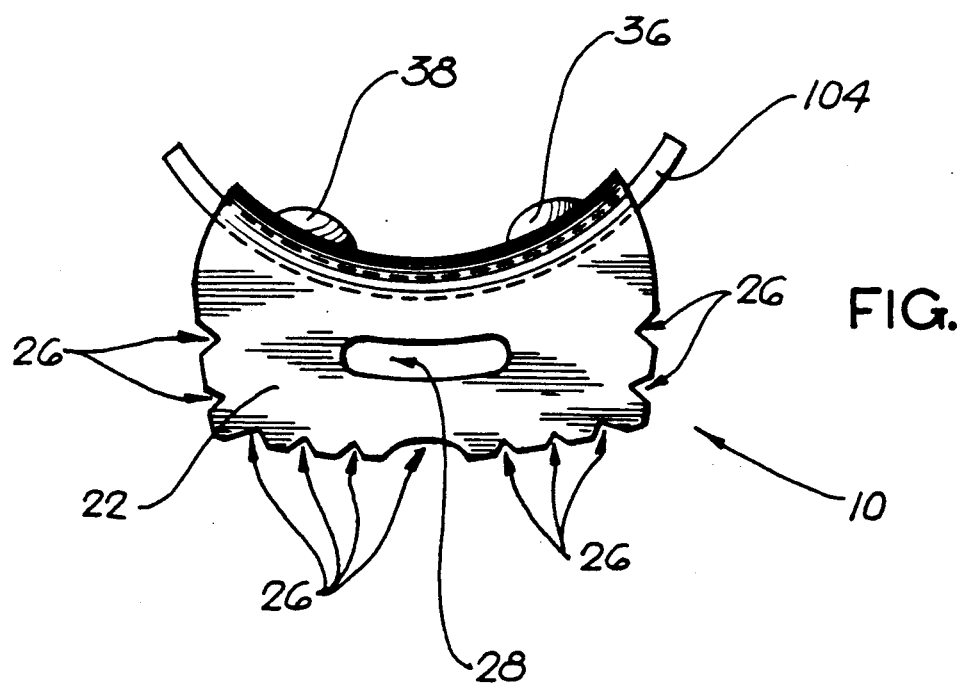
FIG. 5 is a plan view of the tape measure end hook along the line 5—5 of FIG. 2.
Figure 6:
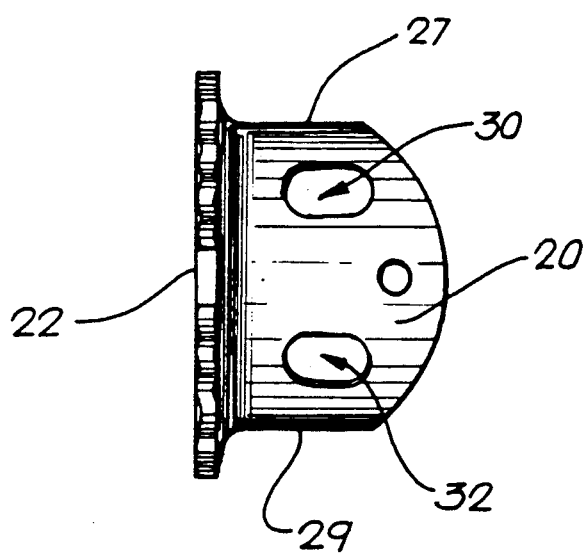
FIG. 6 is a bottom plan view of the embodiment of the tape measure end hook shown in FIG. 2.

As shown in FIG. 5, the abutting member 22 preferably defines cutouts 26 and opening 28 to allow the abutting member 22 to be readily attached to objects located at measurement reference points. As shown in FIG. 6, attachment member 20 defines first and second openings 30 and 32. The first opening 30 and the second opening 32 are preferably located along an axis parallel to a plane defined by the inside surface of the abutting member 22. Preferably this axis is about 0.282 inches from the inside surface of the abutting member 22. The center of the first opening 30 is located a first distance from a first edge 27 of the attachment member 20 and the center of the second opening 32 is located a second distance from a second edge 29 of the attachment member 20. Preferably the first and second distances are substantially equal and are about 0.108 inches. When the attachment member 20 is positioned on the tape 104, the center of the first opening 30 is positioned a third distance from a first edge 31 of the tape 104 and the center of the second opening 32 is positioned a fourth distance from a second edge 33 of the tape 104. Preferably, the third and fourth distances are substantially equal and range between about 0.125 inches and about 0.3125 inches. Preferably the third and fourth distances are about 0.250 inches.

As shown in FIG. 6, openings 30 and 32 are oblong. Each of the openings 30 and 32 preferably have a major diameter of about 0.162 inches and a minor diameter of about 0.129 inches.

Securing means, shown as rivets 36 and 38 are used to attach the tape attachment member 20 to the tape 104. Preferably, the tape attachment member 20 is attached to the upper surface of the tape 104, as shown in FIG. 1. However, the attachment member 20 may also be attached to the lower surface of the tape 104. The rivets 36 and 38 are preferably common steel rivets and pass through openings 30 and 32, respectively, and corresponding openings in the tape 104. The tape openings, however, are preferably circular, rather than oblong, and tightly engage rivets 36 and 38, as shown on FIGS. 3 and 4. Preferably, the end hook 10 is mounted on the tape 104 such that the plane defined by the inside surface of the abutting member 22 is perpendicular to a longitudinal axis defined by the tape 104, and is parallel to a housing lip surface 35.

As shown in FIGS. 3 and 4, openings 30 and 32 do not tightly engage the rivets 36 and 38. The spaces 42 left in openings 30 and 32 after each rivet 36 and 38 is received allow the attachment member 20, and thus the end hook 10, to float. In other words, the end hook 10 is movable along the longitudinal axis defined by the tape 104. This movement of the end hook 10 is limited by the points where rivets 36 and 38 abut the edges of their respective openings 30 and 32.

The amount of movement of the end hook 10 along the longitudinal axis of the tape 104 is controlled by the size of the openings 30 and 32. Preferably, the size of the openings 30 and 32 are such that the maximum distance that the end hook 10 can move along the tape longitudinal axis is equal to the thickness of the abutting member 22. As is known in the art, in this manner the tape measure 100 can provide accurate measurements when the outside surface of the abutting member 22 abuts a reference surface as well as when the inside surface of the abutting member 22 abuts a reference surface.

Turning now to the operation of the end hook of the present invention, as described previously, the end hook 10 is movable along the longitudinal axis of the tape 104 so that the tape measure 100 can consistently provide accurate measurements. When the tape 104 is retracted into the housing 102, an outward force is exerted on the inside surface of the abutting member 22 as the inside surface impacts the housing lip surface 35. Since openings 30 and 32 and rivets 36 and 38 lie on axes parallel to the plane of the inside surface of the abutting member 22, the force on the abutting member 22 is approximately equally distributed between rivet 36 and rivet 38. Thus, as compared to a single rivet design, the force on a single rivet is halved, thus extending the life of each rivet and the useful life of the tape measure.

It has been found that due to the spaces 42 in the openings 30 and 32, it is possible for the end hook 10 to twist such that the plane of the inside surface of the abutting member 22 is not substantially parallel to the housing lip surface 35. If the end hook 10 is twisted when it impacts the housing lip surface 35, one of the two rivets 36 and 38 will bear substantially all of the resulting force and will tend to fail earlier than the other rivet. This problem is solved by the addition of a third opening 34 and further securing means shown in the form of rivet 40.

As shown in FIGS. 7-10, opening 34 is located along an axis perpendicular to a longitudinal axis defined by the attachment member 20. Preferably, opening 34 is also located along the attachment member longitudinal axis. Opening 34 may be on either side of the axis along which openings 30 and 32 are positioned. Preferably, the center of opening 34 is positioned between about 0.375 inches and about 1.000 inches from this axis, with approximately 0.500 inches presently preferred. Opening 34 is also preferably slightly larger along the longitudinal axis of the tape 104 than openings 30 and 32, with a preferred major diameter of about 0.167 inches and a minor diameter of about 0.129 inches. Preferably, when the attachment member 20 is mounted on the tape 104, opening 34 is positioned at a point equidistant from edges 31 and 33, although opening 34 may be positioned closer to one edge or the other.

Figure 8:
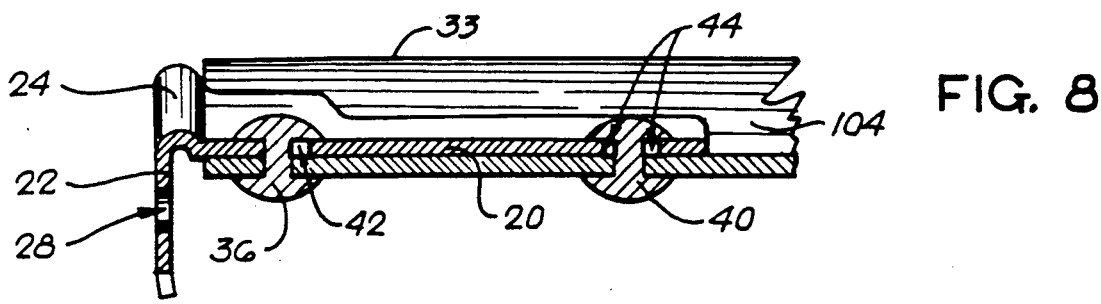
FIG. 8 is a sectional view taken along the line 8—8 of FIG. 7 in which the end hook is in a retracted position toward the tape of the tape measure.
Figure 9:
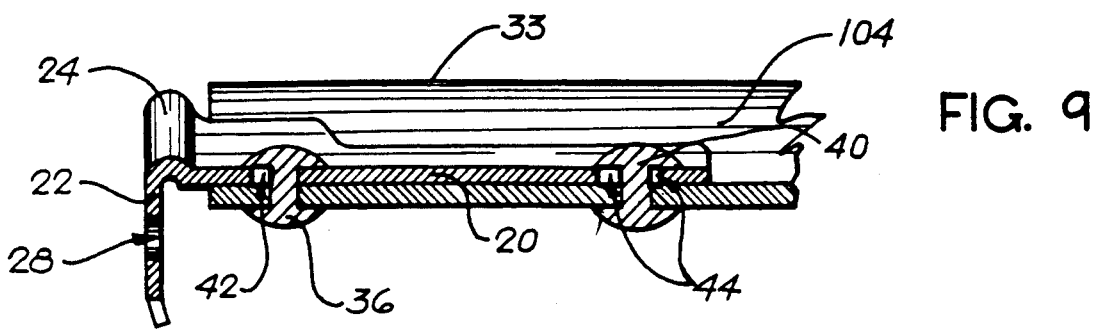
FIG. 9 is a sectional view taken along the line 9—9 of FIG. 7 in which the end hook is in an extended position away from the tape of the tape measure.
Figure 2:
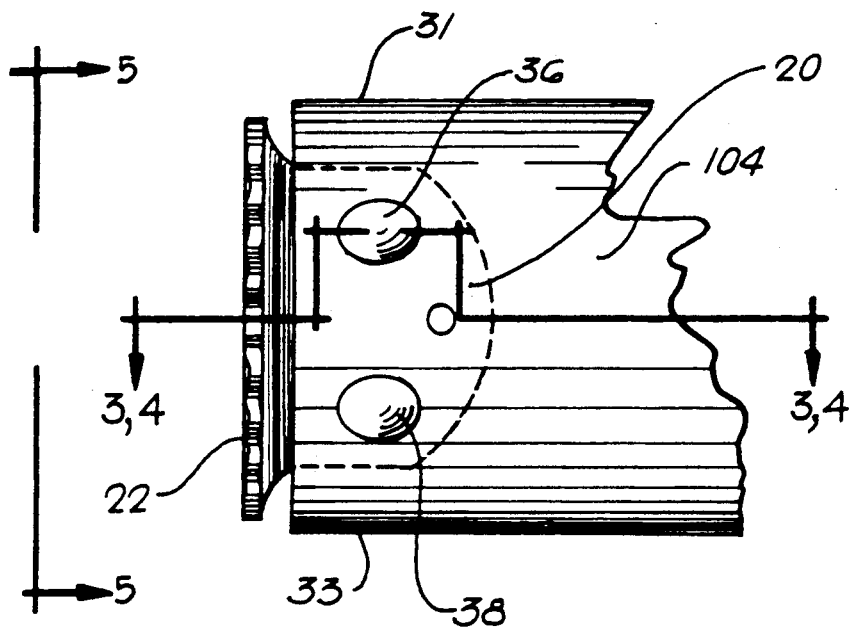
FIG. 2 is bottom plan view of an embodiment of the tape measure end hook mounted on a tape.

Rivet 40 is preferably of the same type as rivets 36 and 38 and passes through opening 34 and a corresponding opening in the tape 104. The tape opening, however, is preferably circular, rather than oblong, and tightly engages rivet 40, as shown in FIGS. 8 and 9.

Since opening 34 is slightly larger along the longitudinal axis of the tape 104 than openings 30 and 32, rivet 40 will never abut the edges of opening 34 that have a tangent line perpendicular to that longitudinal axis. This feature creates spaces 44 in opening 34 after the rivet 40 is received and allows the end hook 10 to float, as described previously.

Rivet 40 acts, in conjunction with opening 34, to substantially limit the movement of the end hook 10 along an axis perpendicular to the longitudinal axis of the tape 104. In limiting such movement, rivet 40 prevents the end hook 10 from substantially twisting, thus allowing the impact force of the end hook 10 against the housing lip surface 35 to be approximately equally distributed between rivet 30 and rivet 32.

Of course, it should be understood that various changes and modifications to the preferred embodiment described herein will be apparent to those skilled in the art. For example, the measurements and ranges disclosed herein are exemplary and should not be construed as limiting. Such changes and modifications can be made without departing from the scope of the present invention and without diminishing its attendant advantages. It is, therefore, intended that such changes and modifications be covered by the following claims.

I claim:

1. An end hook adapted to be attached to a tape measure, said tape measure defining a longitudinal axis and adapted to be received in a housing, said end hook comprising:
    an abutting member having an inside surface and adapted to receive a force from said housing;
    a tape attachment member attached to said abutting member and adapted to move along an axis substantially parallel to said longitudinal axis;
    said tape attachment member defining first, second and third openings having first, second and third perimeters, respectively;
    a reference point defined as a point of said third perimeter of said third opening located farthest from said abutting member;
    first, second and third rivets attached to said tape measure and adapted to be received by said first, second and third openings, respectively; and
    wherein said third rivet and said reference point define a gap when said inside surface receives a force from said housing substantially perpendicular to said inside surface such that said force is substantially absorbed by and substantially equally distributed between said first and second rivets.

2. The end hook of claim 1 wherein:
    said first perimeter defines first and second points, said first point lying closer to said abutting member than said second point;
    said attachment member is adapted to move between a first position where said first rivet abuts said first point and a second position where said first rivet abuts said second point; and
    when said first rivet abuts said second point, said third rivet and said reference point define a gap.

3. The end hook of claim 2 wherein said first and second rivets are located along an axis substantially parallel to a plane defined by said inside surface of said abutting member.

4. The end hook of claim 3 wherein:
    said tape measure defines a first edge substantially parallel to said longitudinal axis and a second edge substantially parallel to said longitudinal axis;
    said third rivet is located at a position approximately equidistant from said first edge and said second edge.

5. The end hook of claim 4 wherein said first rivet is located a first distance from said first edge and said second rivet is located a second distance from said second edge, said first distance and said second distance being approximately equal.

6. The end hook of claim 5 wherein said tape attachment member is integral with said abutting member.

* * * * *